(12) United States Patent
Horihata et al.

(10) Patent No.: US 11,803,053 B2
(45) Date of Patent: Oct. 31, 2023

(54) DISPLAY CONTROL DEVICE AND NON-TRANSITORY TANGIBLE COMPUTER-READABLE MEDIUM THEREFOR

(71) Applicant: DENSO CORPORATION, Kariya (JP)

(72) Inventors: Satoshi Horihata, Kariya (JP); Yasushi Sakuma, Kariya (JP)

(73) Assignee: DENSO CORPORATION, Kariya (JP)

( * ) Notice: Subject to any disclaimer, the term of this patent is extended or adjusted under 35 U.S.C. 154(b) by 528 days.

(21) Appl. No.: 17/102,649

(22) Filed: Nov. 24, 2020

(65) Prior Publication Data

US 2021/0078503 A1 Mar. 18, 2021

Related U.S. Application Data

(63) Continuation of application No. PCT/JP2019/017330, filed on Apr. 24, 2019.

(30) Foreign Application Priority Data

May 29, 2018 (JP) .................................. 2018-102456

(51) Int. Cl.
*B60R 11/00* (2006.01)
*B60R 11/02* (2006.01)

(52) U.S. Cl.
CPC ..... *B60R 11/0229* (2013.01); *B60R 2300/205* (2013.01); *B60R 2300/308* (2013.01)

(58) Field of Classification Search
CPC ........... B60R 11/0229; B60R 2300/205; B60R 2300/308; B60R 2300/103; B60R 2300/302; B60R 2300/305; B60R 2300/307; B60R 2300/605; B60R 1/00; B60K 35/00; G01C 21/36; G02B 27/01;
(Continued)

(56) References Cited

U.S. PATENT DOCUMENTS

2016/0327402 A1  11/2016  Funabiki et al.
2017/0336222 A1  11/2017  Yamaguchi et al.
2018/0252916 A1*  9/2018  Nakamura ......... G02B 27/0101

FOREIGN PATENT DOCUMENTS

JP  2001324344 A  11/2001
JP  2004301525 A  10/2004
JP  2005069799 A   3/2005
(Continued)

*Primary Examiner* — Ian Jen
(74) *Attorney, Agent, or Firm* — Harness, Dickey & Pierce, P.L.C.

(57) ABSTRACT

A display control device that controls a display state of a virtual image to be overlapped on an overlapping target in front of a passenger of the vehicle includes: a display image generator that generates a guide display object image formed by a combination of a plurality of image elements overlapped and displayed along a travel route to notify a passenger of the travel route of the vehicle; and an abandonment determination unit that determines whether each of the image elements is disposed out of a displayable range of the virtual image. When one of the image elements is disposed out of the displayable range, the display image generator displays a part of the image elements as the guide display object image, which is disposed along the travel route just before the one of the image elements that is determined to be out of the displayable range.

8 Claims, 8 Drawing Sheets

(58) Field of Classification Search
CPC .. G09G 5/00; G09G 5/22; G09G 5/36; G09G 5/377; G09G 5/38
See application file for complete search history.

(56) References Cited

FOREIGN PATENT DOCUMENTS

| | | |
|---|---|---|
| JP | 2014213763 A | 11/2014 |
| JP | 2016020876 A | 2/2016 |
| JP | 2017211370 A | 11/2017 |
| WO | WO-2015118859 A1 | 8/2015 |
| WO | WO-2018070193 A1 | 4/2018 |

* cited by examiner

DISPLAY CONTROL DEVICE AND NON-TRANSITORY TANGIBLE COMPUTER-READABLE MEDIUM THEREFOR

CROSS REFERENCE TO RELATED APPLICATION

The present application is a continuation application of International Patent Application No. PCT/JP2019/017330 filed on Apr. 24, 2019, which designated the U.S. and claims the benefit of priority from Japanese Patent Application No. 2018-102456 filed on May 29, 2018. The entire disclosures of all of the above applications are incorporated herein by reference.

TECHNICAL FIELD

The present disclosure relates to a display control device for controlling a display of a virtual image, and a non-transitory tangible computer-readable medium therefor.

BACKGROUND

Conventionally, for example, a vehicle information projection system displays a guide route image and the like in a virtual image using a head-up display device. The guide route image of this vehicle information projection system is displayed and superimposed on the traveling route in the real scenery. Then, when the guide route image deviates from the traveling route in the real scenery, the control for reducing the visibility of the virtual image is performed.

SUMMARY

A display control device that controls a display state of a virtual image to be overlapped on an overlapping target in front of a passenger of the vehicle includes: a display image generator that generates a guide display object image formed by a combination of a plurality of image elements overlapped and displayed along a travel route to notify a passenger of the travel route of the vehicle; and an abandonment determination unit that determines whether each of the image elements is disposed out of a displayable range of the virtual image. When one of the image elements is disposed out of the displayable range, the display image generator displays a part of the image elements as the guide display object image, which is disposed along the travel route just before the one of the image elements that is determined to be out of the displayable range.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
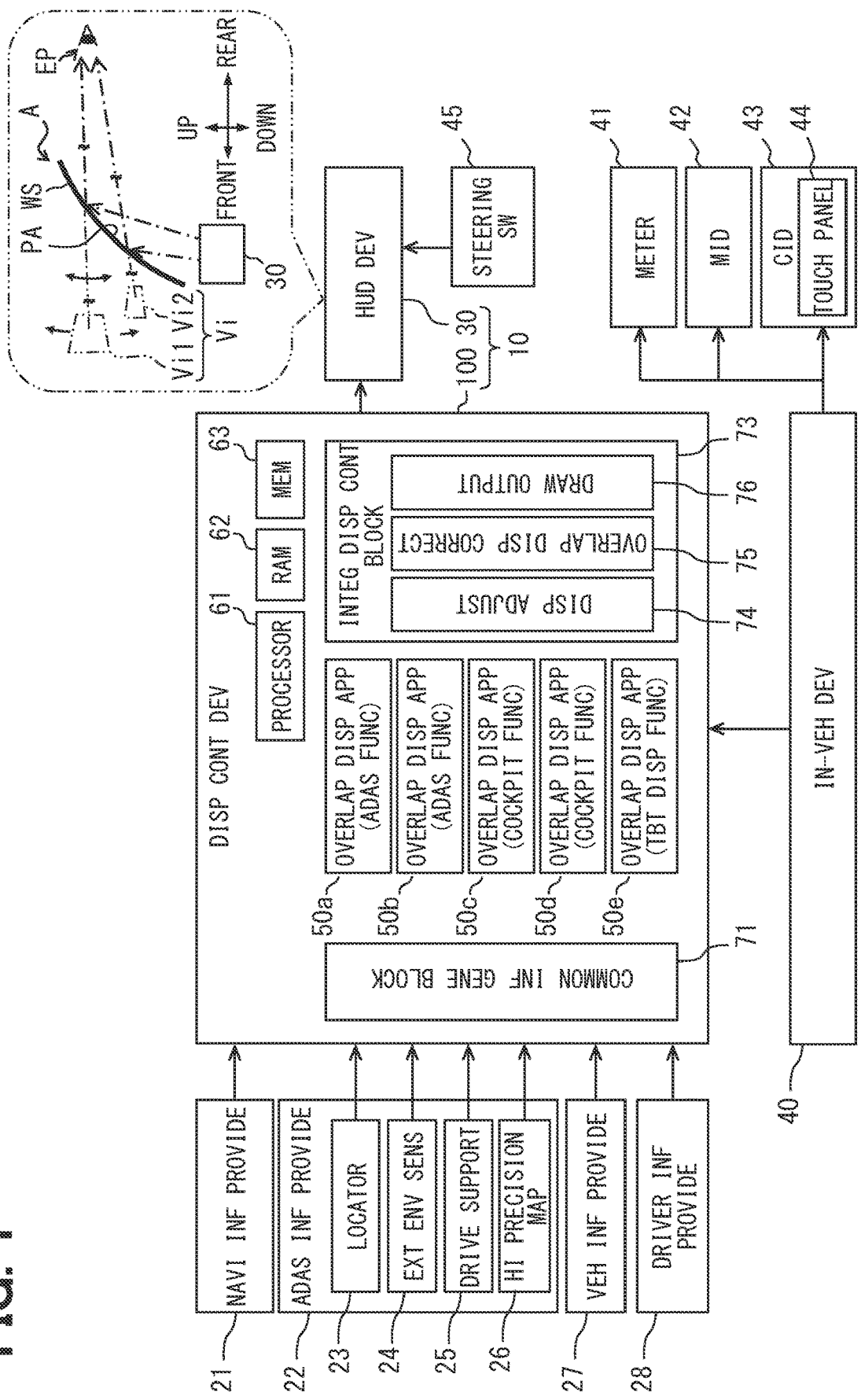
FIG. 1 is a block diagram illustrating an overall image of a in-vehicle configuration related to a virtual image display system.

In a conceivable display control, the visibility of the entire guide route image is integrally reduced based on the deviation determination. In such display control, the display of the guide route image that is not correctly superimposed on the real scenery is continued although it is difficult to visually recognize the image. As a result, a driver who is trying to check the traveling route may feel uncomfortable.

In view of the above point, a display control device, a display control program, and a non-transitory tangible computer-readable medium are provided to be capable of reducing a feeling of strangeness in a virtual image display that notifies a travel route of a vehicle.

In the first aspect of the present disclosure, a display control device that is used in a vehicle and that controls the display of a virtual image superimposed on a superimposition target in the passenger's foreground view, includes: a display image generator that generates a guide display object image for notifying the passenger of a travel route of the vehicle and is formed by a combination of a plurality of image elements displayed and superimposed so as to be arranged along the travel route; and an abandonment determination unit that individually determines whether or not each of the plurality of image elements is deviated from a displayable range of the virtual image. The display image generator, when there is the image element out of the displayable range, displays a part of the image elements among the plurality of image elements as the guide display image, which is disposed along the travelling route just before the image element that is determined to be out of the displayable range.

In the second aspect of the present disclosure, a display control program that is used in a vehicle and that controls the display of a virtual image superimposed on a superimposition target in the passenger's foreground view, causes at least one processor to function as a display image generator that generates a guide display object image for notifying the passenger of a travel route of the vehicle and is formed by a combination of a plurality of image elements displayed and superimposed so as to be arranged along the travel route; and an abandonment determination unit that individually determines whether or not each of the plurality of image elements is deviated from a displayable range of the virtual image. The display image generator, when there is the image element out of the displayable range, displays a part of the image elements among the plurality of image elements as the guide display image, which is disposed along the travelling route just before the image element that is determined to be out of the displayable range.

In a third aspect of the present disclosure, a non-transitory tangible computer readable medium includes computer-implemented instructions, which are used in a vehicle for controlling the display of a virtual image superimposed on a superimposition target in the passenger's foreground view. The instructions include: generating a guide display object image for notifying the passenger of the traveling route of the vehicle by forming a combination of a plurality of image elements displayed and superimposed so as to be aligned along the traveling route; individually determining whether or not each of the plurality of image elements is disposed out of the displayable range of the virtual image; and displaying the image element a part of the image elements among the plurality of image elements as the guide display image, which is disposed along the travelling route just before the image element that is determined to be out of the displayable range when there is the image element out of the displayable range.

In these aspects, the guide display object that notifies the travel route is formed by a plurality of image elements that are displayed in a superimposed manner so as to be arranged along the travel route. Then, when there is an image element outside the displayable range of the virtual image, a part of the image elements among the plurality of image elements is displayed as the guide display image, which is disposed just before the image element that is out of the displayable range when there is the image element out of the displayable range of the virtual image. According to the above, the guide display object can be displayed as a virtual image in a mode in which the object is formed by the image elements that are substantially correctly superimposed on the travel route and the continuity of the travel route is ensured. As a result, it is possible to reduce the feeling of strangeness in the virtual image display that notifies the traveling route of the vehicle.

A display control device 100 according to an embodiment of the present disclosure configures a virtual image display system 10 used in a vehicle A together with a head up display (hereinafter referred to as "HUD") device 30 and the like. The virtual image display system 10 displays a virtual image Vi to be superimposed on a superimposition target object in the foreground view of an occupant (for example, a driver) of the vehicle A such as another vehicle, a pedestrian and a cyclist, and a travel route. The virtual image display system 10 presents various information related to the vehicle A to the driver by augmented reality (hereinafter, "AR") display using the virtual image Vi.

The display control device 100 can communicate with other in-vehicle components via the communication bus of the in-vehicle network. For example, a navigation information providing unit 21, an ADAS information providing unit 22, a vehicle information providing unit 27, a driver information providing unit 28, an in-vehicle device 40, etc. are directly or indirectly electrically connected to the communication bus.

The navigation information providing unit 21 is configured to include at least a navigation device mounted on the vehicle A, and has a map database and a GNSS (Global Navigation Satellite System) receiver. The map database stores a large amount of map data for route guidance by the navigation device. In the map data, a coordinate string indicating a road shape such as nodes and shape points is described. The GNSS receiver receives positioning signals transmitted from a plurality of satellites.

The navigation information providing unit 21 measures the current position of the vehicle A based on the positioning signals received by the GNSS receiver. The navigation information providing unit 21 sequentially outputs the GNSS reception information indicating the current position of the vehicle A to the communication bus and provides the information to the display control device 100. In addition, when the destination is set in the navigation device, the navigation information providing unit 21 provides the map data of the surroundings and traveling direction of the vehicle A read from the map database and the route information to the destination as the map route information to the display control device 100.

The navigation information providing unit 21 may have a configuration capable of communicating with a mobile terminal capable of executing the navigation application software. The navigation information providing unit 21 having such a configuration can provide the map data and the route information acquired by communication with the mobile terminal to the display control device 100 as the map route information.

The ADAS information providing unit 22 is configured to include at least a locator 23, an external sensor 24, a driving support control system 25, a high precision map database 26, and the like. The locator 23 generates accurate positioning information indicating the lane in which the vehicle A is traveling using the composite positioning way in which the GNSS reception information provided from the navigation information providing unit 21 is combined with the measurement information such as information from the inertial sensor and the external sensor 24 and the high accuracy map information. The locator 23 provides the high-accuracy position information to the driving support control system 25, the display control device 100, and the like.

The external sensor 24 is configured to include a front camera, millimeter wave and quasi-millimeter wave radar, lidar, sonar, and the like. The external sensor 24 detects a stationary object and a moving object around the vehicle A, particularly within the front area of the vehicle A. For example, the external sensor 24 detects a pedestrian crosswalk as a stationary object, a road sign and a traffic light, and a pedestrian and a cyclist as a moving object and the like. The external sensor 24 provides the external sensing information indicating the detection result of the object to the locator 23, the driving support control system 25, and the display control device 100.

The driving assistance control system 25 assists the driver's driving operation by using the high-accuracy positioning information by the locator 23, the external sensing information by the external sensor 24, the high-accuracy map information acquired from the high-accuracy map database 26, and the like. The driving support control system 25 has a functional unit that realizes an automatic driving function such as ACC (Adaptive Cruise Control), LTC (lane trace control), and LKA (Lane Keeping Assist). In addition, the driving support control system 25 has a functional unit that realizes a collision avoidance function such as FCW (Forward collision warning) and AEB (Automatic emergency braking). The driving support control system 25 provides the driving support control information from each functional unit to the display control device 100.

The high accuracy map database 26 stores high precision map information as map data with higher precision than the map data stored in the navigation information providing unit 21. The high-precision map stores, in addition to information such as the center line of the roadway and connections between roads, information such as three-dimensional positions and shapes of pedestrian crosswalks, stop lines, traffic signs, traffic lights, and the like. The high accuracy map database 26 provides the high accuracy map information to the locator 23, the driving support control system 25, the display control device 100, and the like. In an area where the high-precision map is not provided, the high-accuracy map database 26 may stop providing the high-precision map information.

The subject vehicle information providing unit 27 is configured to include a plurality of in-vehicle sensors that measure the state of the vehicle A. The vehicle information providing unit 27 provides information such as the current vehicle speed, acceleration, angular velocity, and vehicle attitude of the vehicle A as vehicle travelling information to the display control device 100.

The driver information providing unit 28 is configured to include at least a driver status monitor (Driver Status Monitor, hereinafter, "DSM") mounted on the vehicle A, and has a near infrared light source, a near infrared camera, and an image analysis unit. The driver information providing unit 28 acquires information such as the eye point EP of the driver, the line-of-sight direction, and the degree of eye opening by analyzing the face image captured by the near-infrared camera. The driver information providing unit 28 provides the acquired sensing information of the driver to the display control device 100.

The in-vehicle device 40 is an electronic control unit mounted on the vehicle A, and is electrically connected to in-vehicle indicators such as a combination meter 41, a multi-information display (MID) 42, and a center information display (CID) 43. For example, on the display screen of the CID 43, map data, route information to the destination, and the like are displayed by the navigation device. The display screen of the CID 43 includes a touch panel 44 that can be touch-operated by a driver or the like. The in-vehicle device 40 integrally controls information presentation to the driver in response to a control request to each in-vehicle display device. In addition, the in-vehicle device 40 outputs a control request for superimposing and displaying an image to the display control device 100 in a scene that requires information presentation by virtual image display.

The HUD device 30 is electrically connected to the display control device 100, and acquires the video data generated by the display control device 100. The HUD device 30 includes a projector, a screen, a magnifying optical system, and the like. The HUD device 30 is accommodated in a housing space inside the instrument panel below the windshield WS.

The HUD device 30 projects the light of the display image formed as the virtual image Vi toward the projection range PA of the windshield WS. The light projected toward the windshield WS is reflected toward the driver's seat in the projection area PA and is perceived by the driver. The driver visually recognizes the display image in which the virtual image Vi is superimposed on the superimposition target in the foreground view through the projection range PA.

The projection range PA in which light can be projected by the HUD device 30 is a limited partial area of the entire surface of the windshield WS. The projection area PA is an area in which the virtual image Vi can be displayed on the appearance of the driver. When the foreground is seen from the eye point EP of the driver, the range that can be seen through the projection range PA is substantially the range in which the virtual image Vi can be displayed ("hereinafter, displayable range DA" in FIG. 2).

Figure 2:
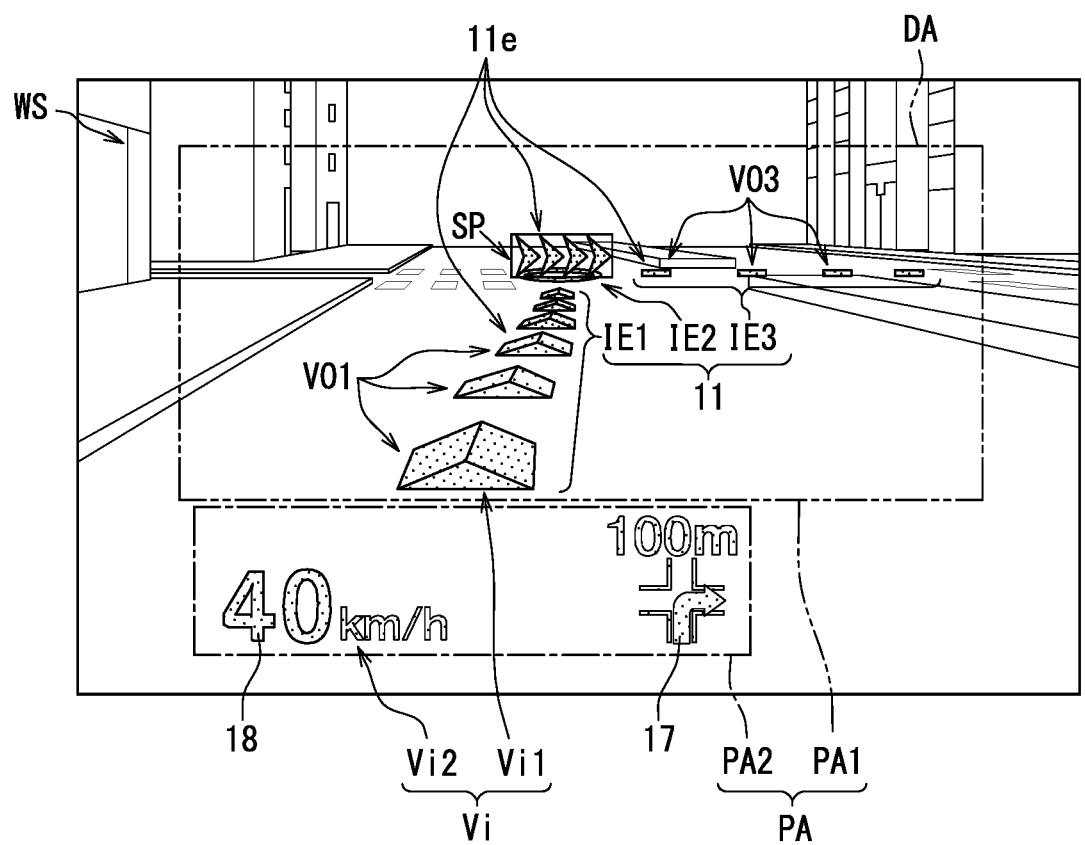
FIG. 2 is a diagram showing an example of information presentation using a distant virtual image and a near virtual image.

As shown in FIG. 2, the projection range PA includes a near virtual image display area PA2 and a far virtual image display area PA1. The near virtual image display area PA2 is narrower than the far virtual image display area PA1 and is located, for example, in the lower left side or the lower right side of the far virtual image display area PA1. The light projected on the near virtual image display area PA2 is imaged as a near virtual image Vi2. On the other hand, the light projected on the far virtual image display area PA1 is formed as a far virtual image Vi1. As an example, the view angle of the far virtual image display area PA1 is 12 degrees in the horizontal (i.e., lateral) direction and 4 degrees in the vertical (i.e., longitudinal) direction.

The near virtual image Vi2 and the far virtual image Vi1 shown in FIGS. 1 and 2 are formed at different positions in the front-rear direction and the up-down direction of the vehicle A, respectively. The near virtual image Vi2 is formed closer to the driver than the far virtual image Vi1, and specifically, is formed in a space of about 2 to 3 meters in the front direction of the vehicle A from the eye point EP of the driver. The near virtual image Vi2 presents the information mainly showing the state of the vehicle A to the driver in the non-AR display manner. As an example, a non-AR display object such as a turn-by-turn icon 17 for instructing the turn left and right and a speed display 18 indicating the vehicle speed is displayed as a near virtual image Vi2.

The far virtual image Vi1 is formed at a position farther from the windshield WS than the near virtual image Vi2, specifically, in a space of about 10 to 20 meters in the front direction of the vehicle A from the eyepoint EP. The far virtual image Vi1 is superposed on a superimposition target (for example, a road surface or a vehicle ahead) in the foreground, so that the AR display is provided. As an example, the AR route 11 or the like indicating the travel route set in the navigation device is displayed as the far virtual image Vi1.

The display control device 100 shown in FIG. 1 is an electronic control unit that controls the display of the virtual image Vi via the HUD device 30. The control circuit of the display control device 100 is mainly configured by a computer having a processor 61, a RAM 62, a memory device 63, and an input/output interface. The processor 61 is configured to include at least one of a CPU (Central Processing Unit) and a GPU (Graphics Processing Unit).

Various programs to be executed by the processor 61 are stored in the memory device 63. In the memory device 63, a plurality of application programs (50*a* to 50*e*) for generating AR contents displayed as virtual images, a presentation management program for integrally controlling virtual image display of AR contents, and the like are stored as display control programs. The display control device 100 has a common information generation block 71 and an integrated display control block 73 as functional blocks based on the presentation management program.

The common information generation block 71 acquires information commonly used by each of the superimposed display applications 50*a* to 50*e* and the integrated display control block 73 from the communication bus. Specifically, GNSS reception information, map route information, high-accuracy positioning information, high-accuracy map information, external sensing information, driving support control information, vehicle motion information, driver sensing information, control request for superimposition display, and the like are acquired by the common information generation block 71. The common information generation block 71 calculates a parameter required for correction of superimposed display based on the acquired information. In addition, the common information generation block 71 implements abstraction of the acquired information.

Based on the information provided by the common information generation block 71, the superimposed display applications 50a to 50e perform the generation of the AR content related to the ADAS function and the cockpit function and the setting of the display flag thereof. Each of the superimposed display applications 50a to 50e is associated with the ACC function, the LKA function and the FCW function of the driving support control system 25, and the navigation device and the like. Each of the superimposed display applications 50a to 50e individually determines the AR content and the non-AR content to be displayed as a virtual image according to the provided information, and issues a display request to the integrated display control block 73.

The integrated display control block 73 uses the information provided by the common information generation block 71 to generate video data of the far virtual image Vi1 and video data of the near virtual image Vi2 based on the display request from the respective superimposed display applications 50a to 50e. The integrated display control block 73 has a display adjustment unit 74, a superimposed display correction unit 75, and a drawing output unit 76.

The display adjustment unit 74 is a functional unit that adjusts the AR content and the non-AR content displayed as the far virtual image Vi1 and the near virtual image Vi2. The display adjustment unit 74 selects the AR content and the non-AR content with high priority from the acquired display request, and sets them as virtual image display targets. With such setting, for example, the AR content that notifies the information with the high priority (or the high urgent level) related to the FCW function is virtually always displayed and is displayed promptly.

The superimposed display correction unit 75 acquires the parameters for superimposition display correction calculated in the common information generation block 71, and generates correction information of the video data of the far virtual image Vi1. The correction information is information for adjusting the imaging position of the far virtual image Vi1 on a virtual line connecting the superimposition target and the eye point EP in a three-dimensional manner so that the far virtual image Vi1 is properly superimposed on the superimposition target. The superimposition display correction unit 75 sequentially generates the correction information in view of considering the relative position of the superimposition target, the position of the eyepoint EP, the vehicle attitude, and the like.

The drawing output unit 76 generates the video data including continuous display images by performing a process for drawing the original image of the content selected by the display adjustment unit 74 on the display image for each of the far virtual image Vi1 and the near virtual image Vi2. The drawing output unit 76 adjusts the drawing position and drawing shape of the original image in each display image, based on the correction information by the superimposition display correction unit 75, for the video data of the far virtual image Vi1. The drawing output unit 76 outputs the generated video data to the HUD device 30 in a video format defined in advance.

One of the plurality of superimposed display applications 50a to 50e described above is the TBT display application 50e that determines the display of the AR route 11 shown in FIG. 2. As described above, the AR route 11 is a guide display object that notifies the driver of the traveling route of the vehicle A (see FIG. 1) based on the route information provided from the navigation information providing unit 21 (see FIG. 1). The AR route 11 is displayed, for example, at an intersection or the like, and clearly indicates to the driver a point (hereinafter, "a specific point SP") at which a right turn, a left turn, a lane change, or the like is performed.

The AR route 11 is formed by a combination of a plurality (e.g., three) of image elements 11e. The image elements 11e are displayed side by side on the road surface in the foreground so as to be lined up along the travel route. Specifically, the AR route 11 is a display object including at least the approach instruction section IE1, the point section IE2, and the exit instruction section IE3. The approach instruction section IE1, the point section IE2, and the exit instruction section IE3 form the AR route 11 indicating the travel route in a display mode such as a single stroke mode in which the sections are continuously arranged along the travel route of the own vehicle.

The approach instruction section IE1 is an image element 11e indicating a front side route (i.e., an entry route) to enter a specific point SP (for example, an intersection). The approach instruction section IE1 is the image element 11e located closest to the front side (i.e., the vehicle side) of the travel route among the three image elements 11e, and is displayed as a virtual image below the point section IE2. The approach instruction unit IE1 includes a plurality of virtual three-dimensional objects VO1 arranged along the approach route to the specific point SP. The size of the virtual three-dimensional object VO1 becomes smaller as it approaches the specific point side from the vehicle side. The plurality of virtual three-dimensional objects VO1 located on the vehicle side are arranged side by side in the vertical direction with an interval therebetween.

The point part IE2 is an image element 11e that is displayed on the specific point SP in a superimposed manner to show the position of the specific point SP to the driver. The point section IE2 is the image element 11e located on the front side of the travel route next to the point section IE2 among the three image elements 11e. The point section IE2 is a barrier wall-like display mode in which the image stands on the road surface. The traveling direction based on the route information is clearly indicated in the point section IE2.

The approach instruction section IE3 is an image element 11e indicating an exit route beyond the specific point SP. The exit instruction section IE3 is mainly displayed as a virtual image on the right side or the left side of the point section IE2. The exit instruction section IE3 includes a plurality of virtual three-dimensional objects VO3 arranged along the exit route from the specific point SP. The plurality of virtual three-dimensional objects VO3 are arranged side by side in the left-right direction with an interval therebetween.

Figure 3:
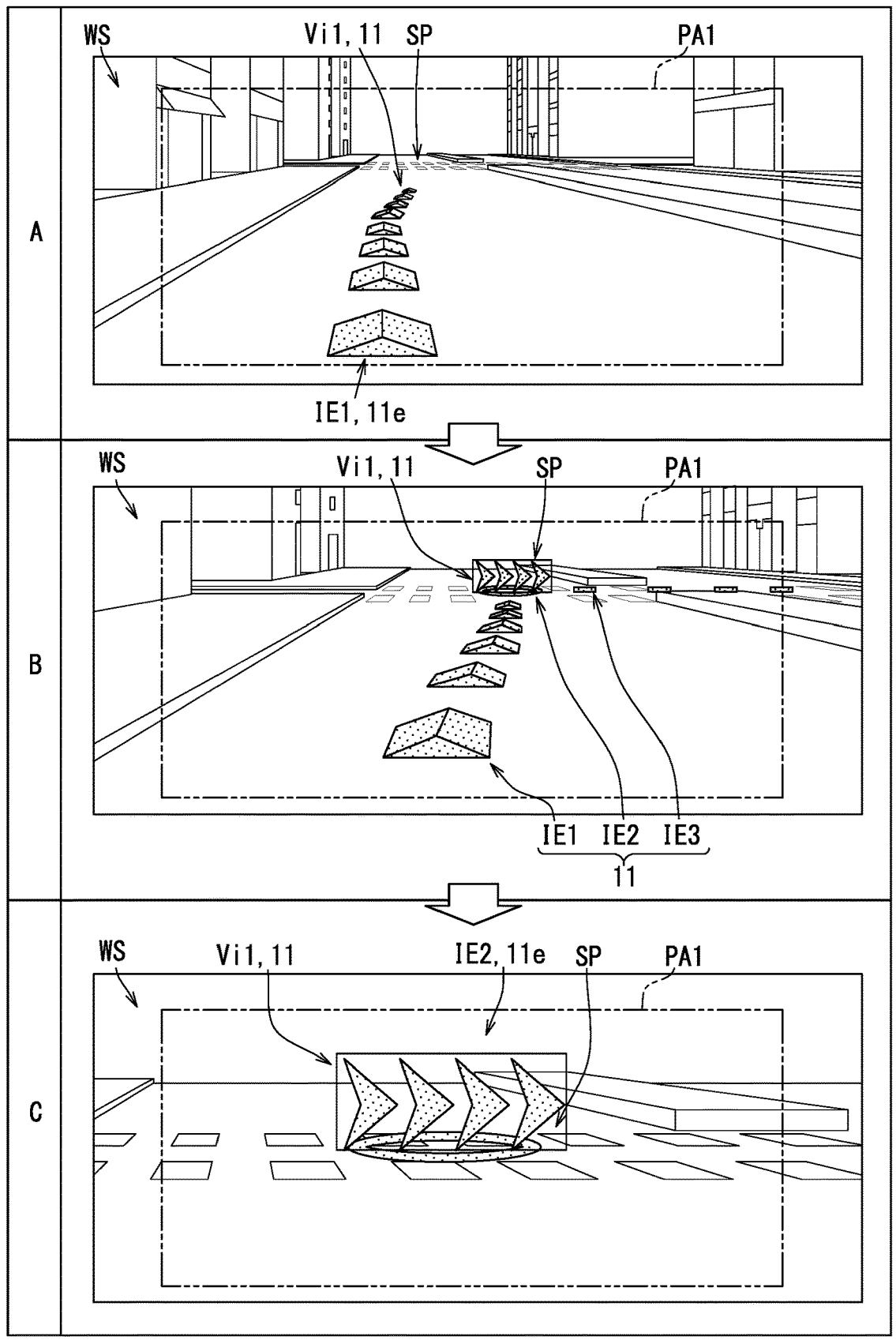
FIG. 3 is a diagram sequentially showing a display change of an AR route due to approach to an intersection.

The TBT display application 50e and the integrated display control block 73 shown in FIG. 1 perform partial drawing of the three image elements 11e according to the traveling state of the vehicle A and the surrounding environment, as shown in FIG. 3. As an example, the display of each image element 11e forming the AR route 11 is changed according to the distance to the specific point SP where the vehicle changes the travelling course. Specifically, the display and non-display of the three image elements 11e are switched by approaching the specific point SP.

As shown in FIG. 3A, when the distance to the specific point SP is sufficient, for example, in a section in which the distance to the intersection exceeds 100 m, only the approach instruction section IE1 among the three image elements 11e is displayed as the AR route 11. In this section, since the specific point SP and the exit route are far, it is difficult to overlap the point section IE2 (see FIG. 2) and the exit instruction section IE3 (see FIG. 2) at the correct position. Therefore, the point section IE2 and the exit instruction section IE3 are not displayed.

Then, as shown in FIG. 3B, when the distance to the intersection becomes less than 100 m due to the approach to the specific point SP, the point section IE2 and the exit instruction section IE3 are displayed together with the approach instruction section IE1. As described above, the AR route 11 becomes a display mode in which the specific point SP and the exit route are emphasized and the route from the entry to the exit of the intersection is continuously shown.

Further, as shown in FIG. 3C, when the distance to the specific point SP is about 30 m, the approach instruction section IE1 (see FIG. 3B) and the exit instruction section IE3 (see FIG. 3B) are hidden while displaying the point section IE2. As a result, the AR route 11 has a display mode in which it is difficult to prevent the risk targets such as an oncoming vehicle, a pedestrian, and a traffic signal from being visually recognized.

Figure 6:
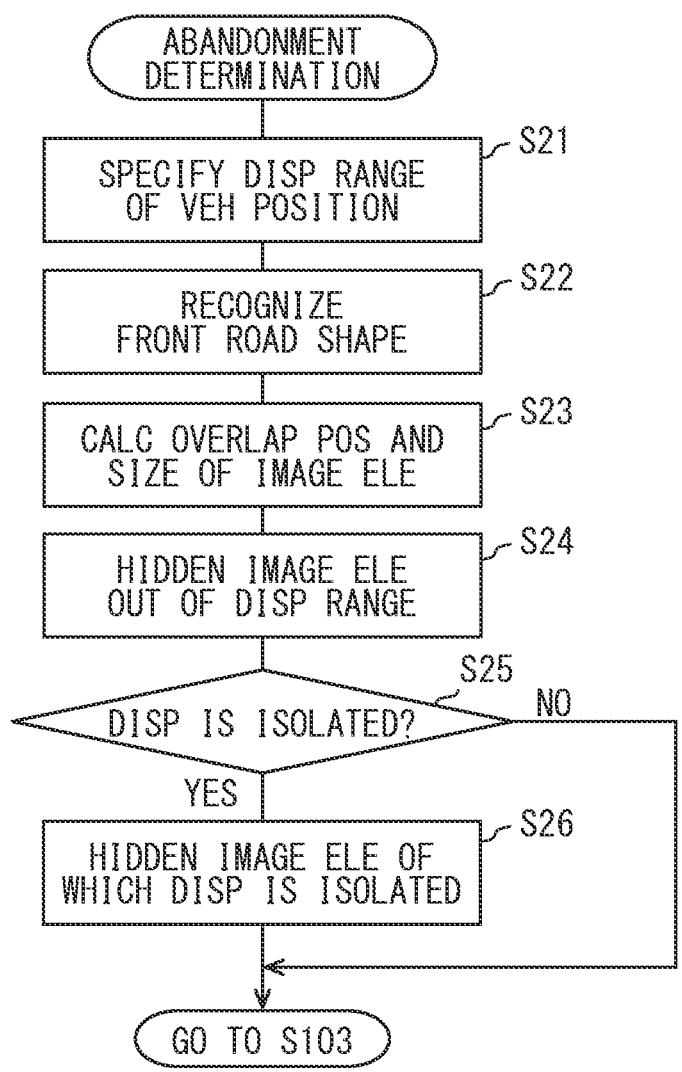
FIG. 6 is a flowchart showing details of an abandonment determination which is a sub-process of the display control process.
Figure 8:
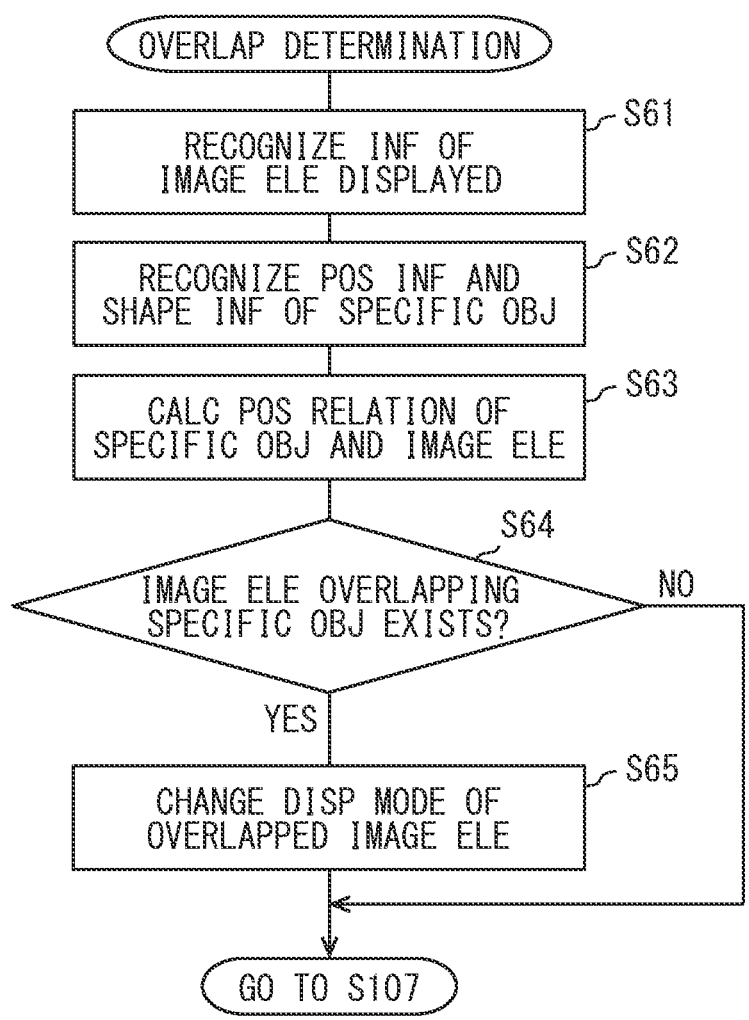
FIG. 8 is a flowchart showing details of an overlapping determination which is a sub-process of the display control process.

In addition, the TBT display application 50e illustrated in FIG. 1 performs an abandonment determination (see FIG. 6) and an overlap determination (see FIG. 8). The TBT display application 50e individually determines whether or not each image element 11e is disposed out of the displayable range DA in the abandonment determination when the three image elements 11e are arranged along the road surface of the travel route.

Figure 4:
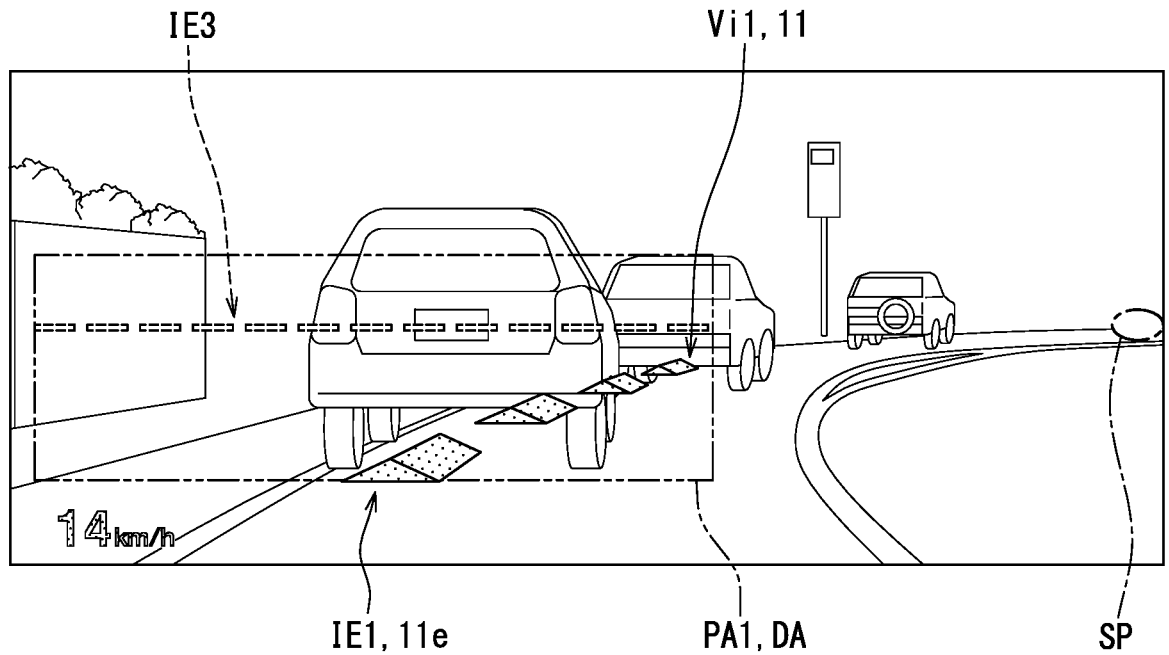
FIG. 4 is a diagram showing a virtual image display in a scene where an intersection is out of a displayable range, and is a diagram showing an AR route in which a point portion and an exit instruction portion are hidden based on an abandonment determination.

As an example, in the scene shown in FIG. 4, the intersection (see the ellipse of the chain double-dashed line) as the specific point SP is out of the displayable range DA, and only a part of the approach route and the exit route is disposed within the displayable range DA. In such a scene, the image element 11e that is disposed closer to the front side of the travel route than the image element 11e determined to be out of view is displayed. That is, the exit instruction section IE3 (shown by a broken line in FIG. 4) is hidden even if a part of the section IE3 can be displayed. Then, the AR route 11 of only the approach instruction section IE1 is displayed. As described above, the continuity of the display on the AR route 11 is secured.

Figure 5:
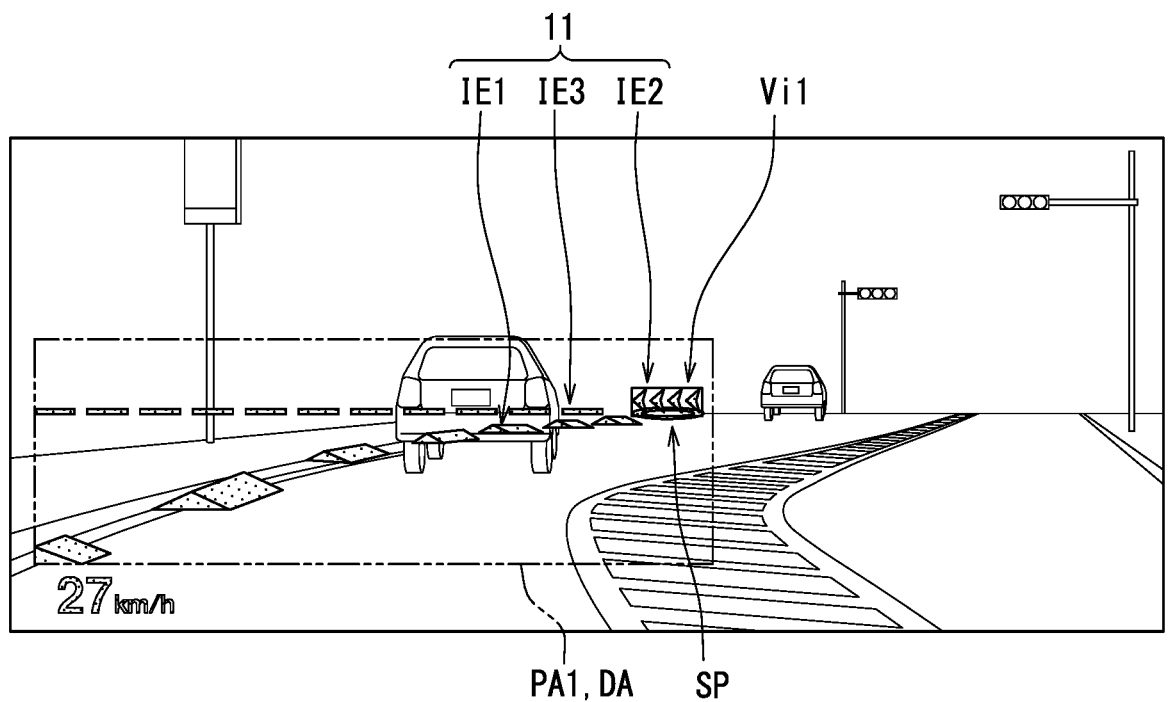
FIG. 5 is a diagram showing a virtual image display in a scene in which an intersection is in a displayable range, and is a diagram showing an AR route in which a point portion and an exit instruction portion are displayed.

As shown in FIG. 5, the TBT display application 50e (see FIG. 1) starts displaying the point section IE2 and the exit instruction section IE3 when the specific point SP is positioned within the displayable range DA due to the approach to the intersection. As described above, the continuous AR route 11 from the approach route to the exit route via the intersection is displayed.

In the abandonment determination that realizes the above display mode (see FIG. 6), the TBT display application 50e illustrated in FIG. 1 specifies the displayable range DA with respect to the vehicle position based on various information obtained by the common information generation block 71 and the view angle information of the HUD device 30 (at S21). The displayable range DA is set mainly based on the three-dimensional positional relationship between the eye point EP and the far virtual image display area PA1.

In addition, the TBT display application 50e recognizes the road shape in front of the vehicle (such as a curvature and a slope of the curve, etc.) based on normal map data or high-accuracy map information and external environment sensing information (at S22). Further, the TBT display application 50e calculates the overlapping position and the overlapping size of the image element 11e for forming the AR route 11 based on the grasped road shape (at S23). Then, the TBT display application 50e compares the specified displayable range DA with the calculated overlapping position of each image element 11e and the like, and hides the image element 11e that is determined to be outside the displayable range DA (at S24).

Next, the TBT display application 50e determines whether or not there is an isolation display in the image element 11e that is not set to be hidden (at S25). As an example, when the point section IE2 is set to be hidden and the exit instruction section IE3 is set to be displayed (see FIG. 4), the TBT display application 50e determines that there is an isolation display, and sets the image element 11e in the isolation display to be hidden (at S26).

The displayable range DA may be a range slightly smaller than the far virtual image display area PA1 when viewed from the eye point EP. In other words, an allowance for a buffer may be provided between the far virtual image display area PA1 and the displayable range DA. For example, in a case where the displayable range DA is set to substantially match the far virtual image display area PA1, when the attitude of the vehicle A changes, the display and non-display of the specific image element 11e may be repeatedly switched. By securing the buffer as described above, frequent switching between display and non-display can be prevented.

Further, the TBT display application 50e individually changes the setting of the display mode and the non-display mode of the image element 11e by the overlapping determination process other than the abandonment determination process. The TBT display application 50e determines, with respect to the image element 11e determined not to be completely abandoned, whether or not the specific object SO (see FIG. 7) in the predetermined foreground view overlaps with the image element 11e in view of the appearance of the driver. The specific object SO is, for example, a road sign such as a pedestrian crossing, a traffic signal, and a pedestrian or the like as an attention target.

Figure 7:
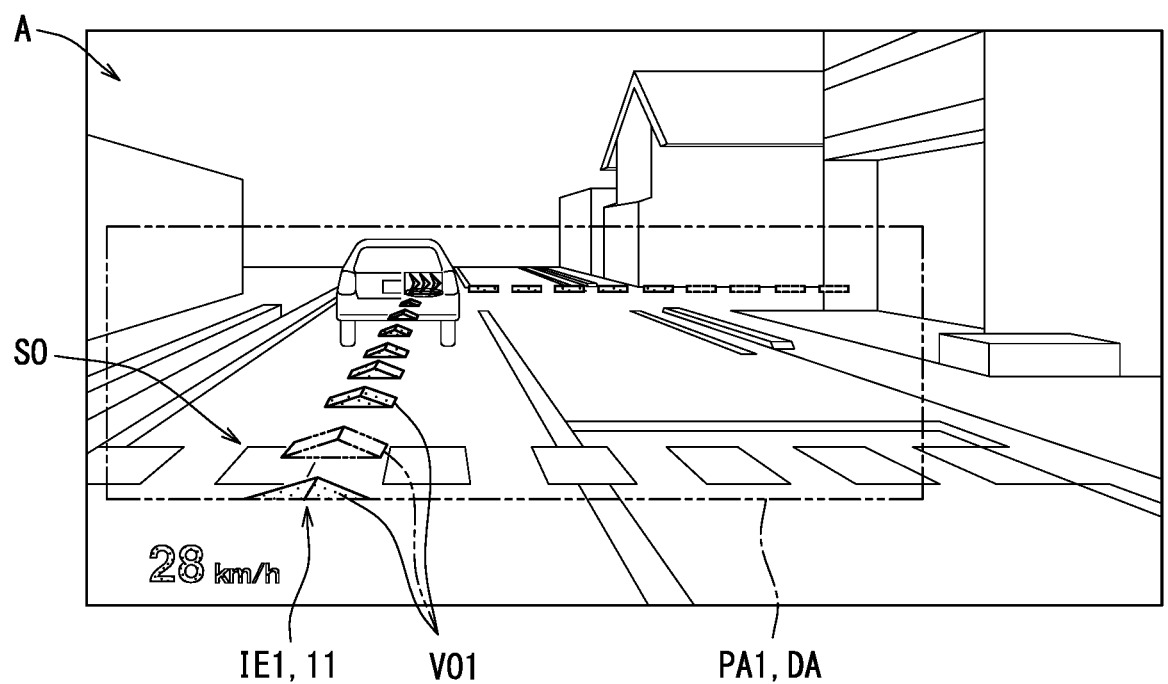
FIG. 7 is a diagram showing a state in which a portion of the approach instruction portion that overlaps with the pedestrian crossing is deleted based on the overlapping determination in a scene in which a pedestrian crossing exists between the own vehicle and the intersection.

As an example, in the scene shown in FIG. 7, a pedestrian crosswalk exists between the own vehicle (i.e., the vehicle A) and the intersection. In such a scene, the approach instruction section IE1 in the AR route 11 is changed to a mode that does not overlap the specific object SO. Specifically, the TBT display application 50e performs a process for not displaying at least one virtual three-dimensional object VO1 in a portion of the approach instruction section IE1 that is determined to overlap the specific object SO, so that the AR display over the pedestrian crosswalk is avoided. Then, at the timing when the vehicle A has passed the pedestrian crossing, the TBT display application 50e cancels the overlap determination between the specific object SO and the approach instruction section IE1, and restarts the entire display of the approach instruction section IE1. The TBT display application 50e may change the setting of the whole of the approach instruction section IE1 to be hidden, instead of change the setting of the virtual three-dimensional object VO1 overlapping the pedestrian crossing to be hidden.

As another example, in a scene in which there is a pedestrian on a pedestrian crosswalk through which the vehicle is to pass after turning right or left at an intersection, the TBT display application 50e hides the three-dimensional object VO3 disposed at a portion of the exit instruction section IE3 that overlaps the pedestrian crossing. Even in this scene, the TBT display application 50e may hide the entire exit instruction section IE3. As yet another example, even in a scene where a part of the exit route is behind a building or the like and is not visible, the TBT display application 50e may hide a part of the virtual three-dimensional object VO1 or a whole of the exit instruction section IE3.

In the overlap determination (see FIG. 8) that realizes the above display control, the TBT display application 50*e* illustrated in FIG. 1 grasps the overlapping position and the overlapping size of the image element 11*e* whose display is provisionally determined by the abandonment determination (at S61). In addition, the TBT display application 50*e* grasps the position information and the shape information of the specific object SO (see FIG. 7) (at S62). Then, the TBT display application 50*e* calculates the three-dimensional positional relationship between the specific object SO and the image element 11*e* (at S63), and determines whether or not they overlap with each other when viewing from the eye point EP (at S64). When there is an image element 11*e* that overlaps the specific object SO, the TBT display application 50*e* determines to change the display mode or switch to the non-display setting for this image element 11*e* (at S65).

Figure 9:
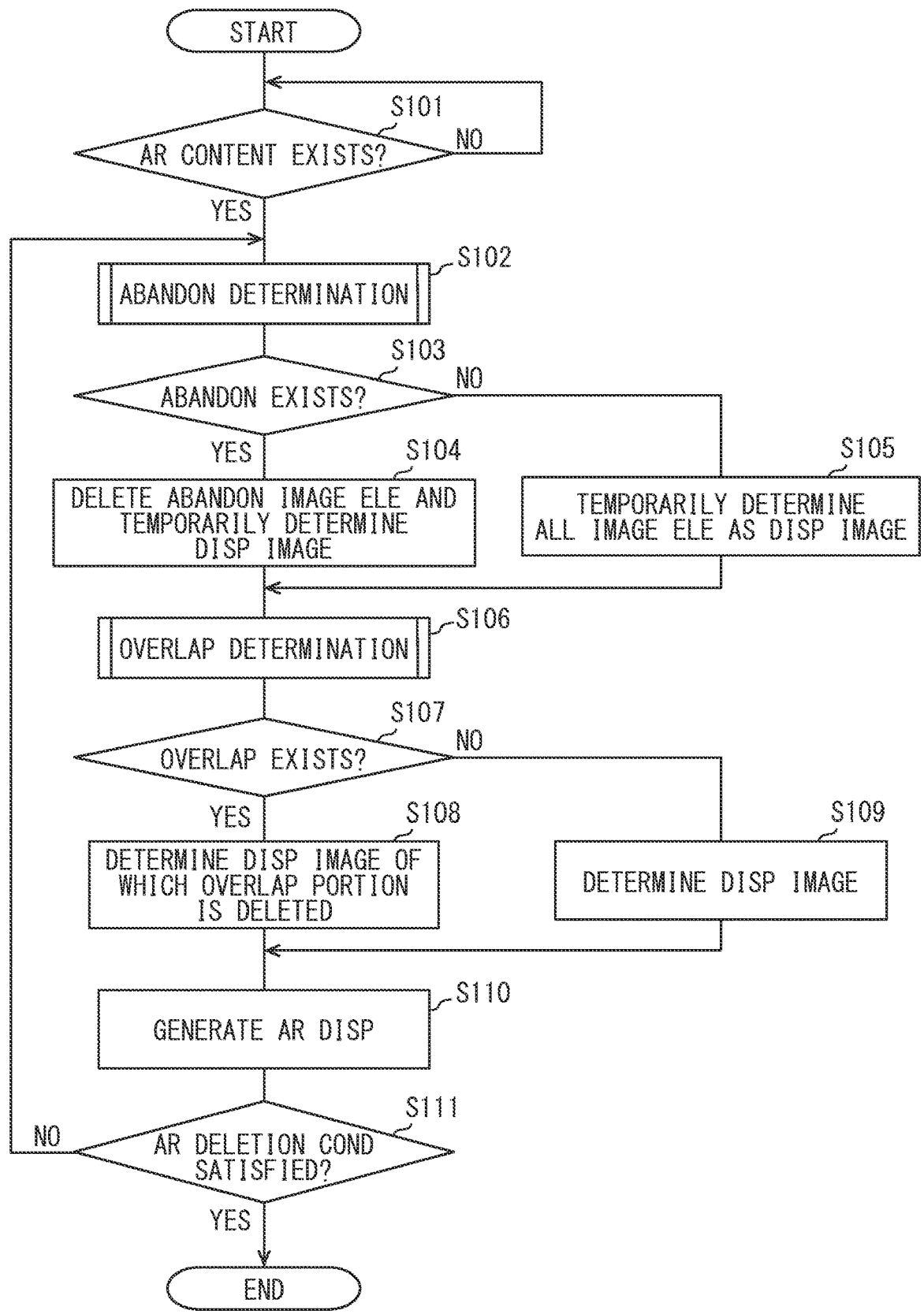
FIG. 9 is a flow chart illustrating details of a display control process performed in a display control device.

In order to realize the display of the AR route 11 described above, the entire display control process performed by the display control device 100 will be described in detail based on FIG. 9 and with reference to FIGS. 1 and 2. The display control process shown in FIG. 9 is triggered to start by the occurrence of a specific event such as completion of route setting in a navigation device or the like.

In S101, it is determined whether or not there is an AR content to be displayed, such as the AR route 11. When it is determined in S101 that there is the AR content, the process proceeds to S102. On the other hand, when it is determined that there is no AR content, the state of waiting for the generation of the AR content is maintained by repeating a step of S101.

In S102, the abandonment determination of the image element 11*e* is performed (see FIG. 6), and the process proceeds to S103. In S103, the process branches based on the result of the abandonment determination in S102. When it is determined in S102 that there is the image element 11*e* which is hidden due to the abandonment, the process proceeds from S103 to S104. In S104, a display image obtained by deleting the image element 11*e* that is hidden due to the abandonment determination is provisionally set, and the process proceeds to S106.

On the other hand, when it is determined in S102 that there is no image element 11*e* that has been abandoned, the process proceeds from S103 to S105. In S105, the display image formed by drawing all the image elements 11*e* of the AR route 11 is provisionally set, and the process proceeds to S106.

In S106, the overlapping determination of the AR content (see FIG. 8) is performed, and the process proceeds to S107. In S107, the process branches based on the result of the overlapping determination in S106. When it is determined in S106 that there is the image element 11*e* which is estimated to overlap with the specific object SO, the process proceeds from S107 to S108.

In S108, the display image provisionally determined in S104 or S105 is corrected, and a display image, in which a part or all of the image elements 11*e* overlapping the specific object SO is deleted, is determined, and the process proceeds to S110. As described above, the drawing of the overlapping portion of the image element 11*e* is interrupted, and the virtual three-dimensional object VO1 overlapping the specific object SO, which is provisionally displayed as a virtual image, is in a non-display state.

When it is determined in S106 that there is no image element 11*e* which is estimated to overlap with the specific object SO, the process proceeds from S107 to S109. In S109, the display image provisionally determined in S104 or S105 is determined as a formal display image, and the process proceeds to S110.

In S110, the AR display generation is performed. Specifically, in S110, the display image based on the determination of S108 or S109 is continuously drawn, and is output as video data to the HUD device 30. As described above, the display of the AR content corrected according to the traveling situation of the vehicle A and the surrounding environment is generated.

In S111, it is determined whether or not the erasing condition of the AR display is satisfied. The erasing condition is a condition that is set in advance, such as passing through a guidance intersection (i.e., a specific point SP) for route guidance or remaining distance to the guidance intersection less than several meters. When it is determined in S111 that the erase condition is not satisfied, the process returns to S102. On the other hand, when it is determined in S111 that the erasing condition is satisfied, the display control process ends.

In addition to the automatic change of the display mode as described above, the TBT display application 50*e* may switch the setting of the display and the hiding of the plurality of image elements 11*e* based on the operation input of the driver or the like. As an example, in the default setting (see FIG. 3B), the display of all the image elements 11*e* for forming the AR route 11 is permitted in the section of 100 meters to 30 meters before the specific point SP. The TBT display application 50*e* switches the display setting from the default setting and flexibly changes the image element 11*e* to be displayed, based on the input to the touch panel 44, the steering switch 45, and the like by the user (i.e., the driver or the like).

For example, in one display setting based on a user operation, the TBT display application 50*e* displays the approach instruction section IE1 and the exit instruction section IE3 in the section from 100 meters to 30 meters before the specific point SP (i.e., the intersection or the like). Then, the TBT display application 50*e* switches to display only the point section IE2 at the position where the distance to the specific point SP is 30 meters.

When approaching the specific point SP, only the point section IE2 is displayed as the AR route 11 in the default display setting (see FIG. 3C). However, in another one display setting based on the user operation, the TBT display application 50*e* continues to display all image elements (i.e., three image elements) 11*e* even when approaching the intersection.

Further, the exit instruction section IE3 is more likely to have difficulty in superimposing with high accuracy, compared with the approach instruction section IE1. Therefore, for the user who is likely to feel annoyed, the TBT display application 50*e* may always hide the exit instruction section IE3 based on the user operation. Alternatively, the display setting may be made such that the visibility of the exit instruction section IE3 is lower than that of the approach instruction section IE1.

In the present embodiment described thus, the AR route 11 that notifies the travel route is formed by the plurality of image elements 11*e* that are superimposed and displayed so as to be lined up along the travel route. Then, when there is an image element 11*e* outside the displayable range DA of the virtual image Vi, among the plurality of image elements 11*e*, one of the image elements 11*e* disposed on the front side of the image element 11*e* outside the displayable range DA is displayed as the AR route 11.

Specifically, when it is determined that the point section IE2 is out of the displayable range DA, the approach instruction section IE1 disposed on the front side of the traveling route with respect to the point section IE2 is rendered in the video data, and is displayed as the AR route 11 in the foreground view in a virtual image manner. According to the above, the AR route 11 is formed by the approach instruction section IE1 that is properly superimposed on the travel route, and is displayed as a virtual image in a manner in which the continuity of the travel route is ensured. As a result, it is possible to reduce the feeling of strangeness in the virtual image display that notifies the traveling route of the vehicle.

In addition, the TBT display application 50e of the present embodiment determines the displayable range DA in real time by performing continuous abandonment determination during the approach period to the specific point SP, and accurately identifies the image element 11e in which the abandonment occurs. According to the above, the display of the broken AR route 11 in which the approach route and the exit route are not connected, in other words, the AR route 11 in which the exit instruction section IE3 is isolated is effectively prevented. Based on the above, it is more difficult for the driver to feel the strangeness of the virtual image display.

Further, in this embodiment, the display of the image element 11e overlapping the specific object SO is suppressed. As a result, the AR route 11 becomes a mode in which the route 11 does not overlap with the road sign, the pedestrian crossing, the pedestrian, etc. defined as the specific object SO, and it is difficult for the driver to prevent from visually recognizing the route 11. According to the above, it is possible to display a virtual image that is difficult for the driver to feel bothersome.

Further, according to the design in which one AR route 11 is disassembled into a plurality of parts, as in the present embodiment, it is possible to reduce the calculation load of the process for changing the display mode according to the situation change. More specifically, when the AR content such as the AR route 11 has an integrated design, it is necessary to perform a process of calculating a drawing shape, a part of which overlapping the specific object SO is removed when viewing the eyepoint EP, according to the situation. On the other hand, when the design of the AR content is decomposed into a plurality of image elements 11e as in this embodiment, the drawing shape of the AR content most suitable for the current situation can be realized by simply interrupting the drawing of some image elements 11e. Therefore, by adopting the process of switching between the display and the non-display for each image element 11e, the calculation load can be reduced as compared with the process of partially erasing the integrated AR content.

In addition, the AR route 11 in this embodiment includes three image elements 11e. With such a display configuration, the load of the process of switching between display and hiding for each image element 11e is easier to reduce than the case where the AR route 11 is formed by a larger number of image elements 11e.

Further, the AR route 11 of the present embodiment includes an approach instruction section IE1 indicating an entry route, a point section IE2 indicating a specific point SP, and an exit instruction section IE3 indicating an exit route. According to such a display configuration, even if the AR route 11 is divided into the plurality of image elements 11e, the traveling route of the vehicle A can be easily recognized by and shown to the driver.

Further, in the present embodiment, the display mode of each image element 11e is changed according to the distance to the specific point SP. Specifically, the TBT display application 50e switches each image element 11e from the non-display to the display at the stage when each image element 11e can be appropriately superimposed on the superimposition target. According to the above, the display of the image element 11e deviated from the superimposition target can be avoided, so that the driver is less likely to feel a sense of discomfort with respect to the virtual image display.

Further, the display/non-display setting of each image element 11e in the present embodiment can be individually switched based on a user operation. With such a configuration, the image element 11e that the user does not require to display can be maintained in a non-display state according to the preference of the user. As a result, in combination with the automatic switching to the non-display state based on the abandonment determination and the overlap determination, a virtual image display that makes it more difficult for the driver to feel discomfort is realized. Furthermore, even if some of the image elements 11e are switched to the non-display setting, in the present embodiment, it is unlikely that the load of calculation processing will increase.

In the present embodiment, the far virtual image Vi1 corresponds to a "virtual image", the AR route 11 corresponds to a "guidance display object", and the touch panel 44 and the steering switch 45 correspond to an "operation unit". Further, the TBT display application 50e that performs the abandonment determination in S102 corresponds to the "abandonment determination unit", and the TBT display application 50e that performs the overlap determination in S106 corresponds to the "overlap determination unit". Furthermore, the TBT display application 50e and the integrated display control block 73 that perform the AR display generation in S106 correspond to the "display generation unit".

Other Embodiments

Although one embodiment of the present disclosure has been described above, the present disclosure is not construed as being limited to the above-mentioned embodiments, and can be applied to various embodiments and combinations within a scope that does not depart from the gist of the present disclosure.

In the above-described embodiment, the AR route including the approach instruction section, the point section, and the exit instruction section is displayed as the guidance display object. Alternatively, the display shape of the entire guide display object and the display shapes of the approach instruction section, the point section, and the exit instruction section may be changed as appropriate. Further, the number of image elements forming the guide display object may be four or more, or may be two.

In the above-described embodiment, the display shape that does not overlap the specific object is changed for each image element based on the overlap determination. The specific object that is the object of such overlap determination may be changed as appropriate. Further, the overlap determination as described above may be omitted. Similarly, the display control for switching between the display state and the non-display state of image elements depending on the distance to a specific point can be omitted.

In the above embodiment, the display/non-display setting of each image element may be switched by the user operation. The input interface used for such user operation is not limited to the touch panel and the steering switch. For example, an input by at least one of a voice and a gesture may be a user's operation and may be used to switch between display and non-display settings of each image element. The display setting switching function based on such a user operation may be omitted.

The HUD device according to the above-described embodiment is a bifocal projection device capable of forming a far virtual image and a near virtual image at completely different positions. Alternatively, the HUD device may be a single focus projection device. In an example of the monofocal HUD device, the image plane of the projected virtual image light has a posture such that the plane is inclined toward the front side of the vehicle in the upward direction. In such a HUD device, the virtual image formed in the vicinity of the lower edge of the image plane is a "near virtual image", and the non-AR display is performed. On the other hand, the virtual image formed upward from the center of the image plane is defined as a "distant virtual image", and the AR display is performed. Even in the mode in which the HUD device as described above is adopted, it is possible to perform the display control based on the abandonment determination for the far virtual image. Further, the HUD device may be configured not to display the virtual image corresponding to the "near virtual image".

The optical configuration of the HUD device may be changed as appropriate. For example, the projector may be configured to include a laser light source and a MEMS scanner. For example, the projector may be a DLP (Digital Light Processing, registered trademark) projector using a DMD (Digital Micromirror Device). Further, a projector using LCOS (Liquid Crystal On Silicon) or the like, a liquid crystal projector having a liquid crystal panel and an LED light source, and the like may be adopted for the HUD device.

The display control device of the above embodiment is provided as an electronic control unit separate from the HUD device. Alternatively, each function of the display control device may be mounted in, for example, a control circuit provided in the HUD device, or may be mounted in a control circuit or the like provided in the combination meter.

In the above embodiments, each function provided by the control circuit of the display control device can be provided by software and hardware for executing the software, only software, only hardware, or a complex combination of the hardware and the software. Moreover, if the above functions are provided by an electronic circuit that is hardware, each function may also be provided by a digital circuit which includes multiple logic circuits, or an analog circuit.

Various non-transitory tangible storage media (non-transitory tangible storage medium) such as a flash memory and a hard disk may be employed as the memory device for storing the display control program and the TBT display application and the like. The form of such a storage medium may also be changed as appropriate. For example, the storage medium may be in the form of a memory card or the like, inserted into a slot portion provided in the display control device, and electrically connected to the control circuit. Further, the storage medium is not limited to the memory device of the in-vehicle device as described above, and may be an optical disk serving as a copy base of the program to the memory device, a hard disk drive of a general-purpose computer, or the like.

The controller and the method described in the present disclosure may be implemented by a special purpose computer which is configured with a memory and a processor programmed to execute one or more particular functions embodied in computer programs of the memory. Alternatively, the controller and the method described in the present disclosure may be implemented by a special purpose computer configured as a processor with one or more special purpose hardware logic circuits. Alternatively, the control unit and the method described in the present disclosure may be implemented by one or more special purpose computer, which is configured as a combination of a processor and a memory, which are programmed to perform one or more functions, and a processor which is configured with one or more hardware logic circuits. The computer programs may be stored, as instructions to be executed by a computer, in a tangible non-transitory computer-readable medium.

Here, the process of the flowchart or the flowchart described in this application includes a plurality of sections (or steps), and each section is expressed as, for example, S101. Further, each section may be divided into several subsections, while several sections may be combined into one section. Furthermore, each section thus configured may be referred to as a device, module, or means.

Although the present disclosure has been described in accordance with the embodiments, it is understood that the present disclosure is not limited to the embodiments and structures disclosed therein. The present disclosure covers various modification examples and equivalent arrangements. In addition, various combinations and forms, and further, other combinations and forms including only one element, or more or less than these elements are also within the sprit and the scope of the present disclosure.

What is claimed is:

1. A display control device for a vehicle controlling a display state of a virtual image to be overlapped on an overlapping target disposed in front of a passenger, the display control device comprising:
   a display image generator for generating a guide display object image for notifying the passenger of a travel route of the vehicle formed by a combination of a plurality of image elements overlapped and displayed so as to be arranged along the travel route; and
   an abandonment determination unit for individually determining whether each of the image elements is disposed out of a displayable range of the virtual image, wherein:
   when one of the image elements is disposed out of the displayable range, the display image generator displays a part of the image elements as the guide display object image, which is disposed along the travel route on a near side of the one of the image elements that is determined to be out of the displayable range, and does not display a remaining part of the image elements which is disposed along the travel route on a far side of the one of the image elements that is determined to be out of the displayable range even if a portion of the remaining part of the image elements is disposed in the displayable range.

2. The display control device according to claim 1, wherein:
   an overlap determination unit for determining whether each of the plurality of image elements overlaps with a specific object disposed in a predetermined foreground area; and
   the display generator changes a display mode of an other one of the image elements determined to overlap with the specific object to be an other display mode in which the other one of the image elements does not overlap with the specific object.

3. The display control device according to claim 1, wherein:

the display generator forms the guide display object image for notifying a change of a course using three or more image elements.

4. The display control device according to claim 3, wherein:
   the guidance display object image includes a point section indicating a specific point at which the vehicle is to change the course, an approach instruction section indicating an approach route to the specific point, and an exit instruction unit indicating an exit route from the specific point, as the image elements.

5. The display control device according to claim 1, wherein:
   the display generator changes a display mode of each of the image elements forming the guide display object image according to a distance from a current position of the vehicle to a specific point where the vehicle changes a course.

6. The display control device according to claim 1, wherein:
   the display generator sets a display and non-display state of each of the plurality of image elements based on an input operation of an operation unit.

7. A display control device for a vehicle controlling a display state of a virtual image to be overlapped on an overlapping target disposed in front of a passenger, the display control device comprising:
   one or more processors; and
   a memory coupled to the one or more processors and storing program instructions that when executed by the one or more processors cause the one or more processors to at least:
      generating a guide display object image for notifying the passenger of a travel route of the vehicle formed by a combination of a plurality of image elements overlapped and displayed so as to be arranged along the travel route; and
      individually determining whether each of the image elements is disposed out of a displayable range of the virtual image; and
      when one of the image elements is disposed out of the displayable range, displaying a part of the image elements as the guide display object image, which is disposed along a travel route on a near side of the one of the image elements that is determined to be out of the displayable range, and not displaying a remaining part of the image elements which is disposed along the travel route on a far side of the one of the image elements that is determined to be out of the displayable range even if a portion of the remaining part of the image elements is disposed in the displayable range.

8. A non-transitory tangible computer readable storage medium comprising instructions being executed by a computer, the instructions for a vehicle to control a display state of a virtual image overlapped on an overlapping target disposed in front of a passenger, the instructions including:
   generating a guide display object image for notifying the passenger of a travel route of the vehicle formed by a combination of a plurality of image elements overlapped and displayed so as to be arranged along the travel route; and
   individually determining whether each of the image elements is disposed out of a displayable range of the virtual image; and
   when one of the image elements is disposed out of the displayable range, displaying a part of the image elements as the guide display object image, which is disposed along a travel route on a near side of the one of the image elements that is determined to be out of the displayable range, and not displaying a remaining part of the image elements which is disposed along the travel route on a far side of the one of the image elements that is determined to be out of the displayable range even if a portion of the remaining part of the image elements is disposed in the displayable range.

* * * * *